United States Patent [19]

Martinez, Jr.

[11] Patent Number: 4,886,284
[45] Date of Patent: Dec. 12, 1989

[54] DOLLY FOR SUPPORTING OBJECTS WITH ADJUSTABLE HEIGHT AND INCLINATION

[75] Inventor: Antonio Martinez, Jr., El Monte, Calif.

[73] Assignee: Atel Corporation, South El Monte, Calif.

[21] Appl. No.: 549,266

[22] Filed: Nov. 4, 1983

[51] Int. Cl.⁴ .................................. B62D 21/02
[52] U.S. Cl. .................. 280/43.12; 254/2 R; 254/84; 414/427; 414/429
[58] Field of Search ............ 280/43.1, 43.12, 6 H; 254/2 R, 84; 414/426–427, 429

[56] References Cited

U.S. PATENT DOCUMENTS

| | | | |
|---|---|---|---|
| 2,358,957 | 9/1944 | Barrett | 280/43.12 |
| 3,166,139 | 1/1965 | Ulinski | 254/2 R |
| 3,287,024 | 11/1966 | Ulinski | 280/43.12 |
| 3,743,044 | 7/1973 | Scheele | 280/6 H |
| 4,221,526 | 9/1980 | Crandall | 280/43.12 |

FOREIGN PATENT DOCUMENTS 1107384 5/1961 Fed. Rep. of Germany ..... 254/2 R

Primary Examiner—Charles A. Marmor
Assistant Examiner—Eric Culbreth
Attorney, Agent, or Firm—Donald D. Mon

[57] ABSTRACT

A dolly to transport articles such as wheel assemblies and transmissions, to present them with adjustable height and inclination. Support member on a base member are both controlled by seaparate elevator means, which are separately operable to vary the height and inclination of an article supported by them.

15 Claims, 2 Drawing Sheets

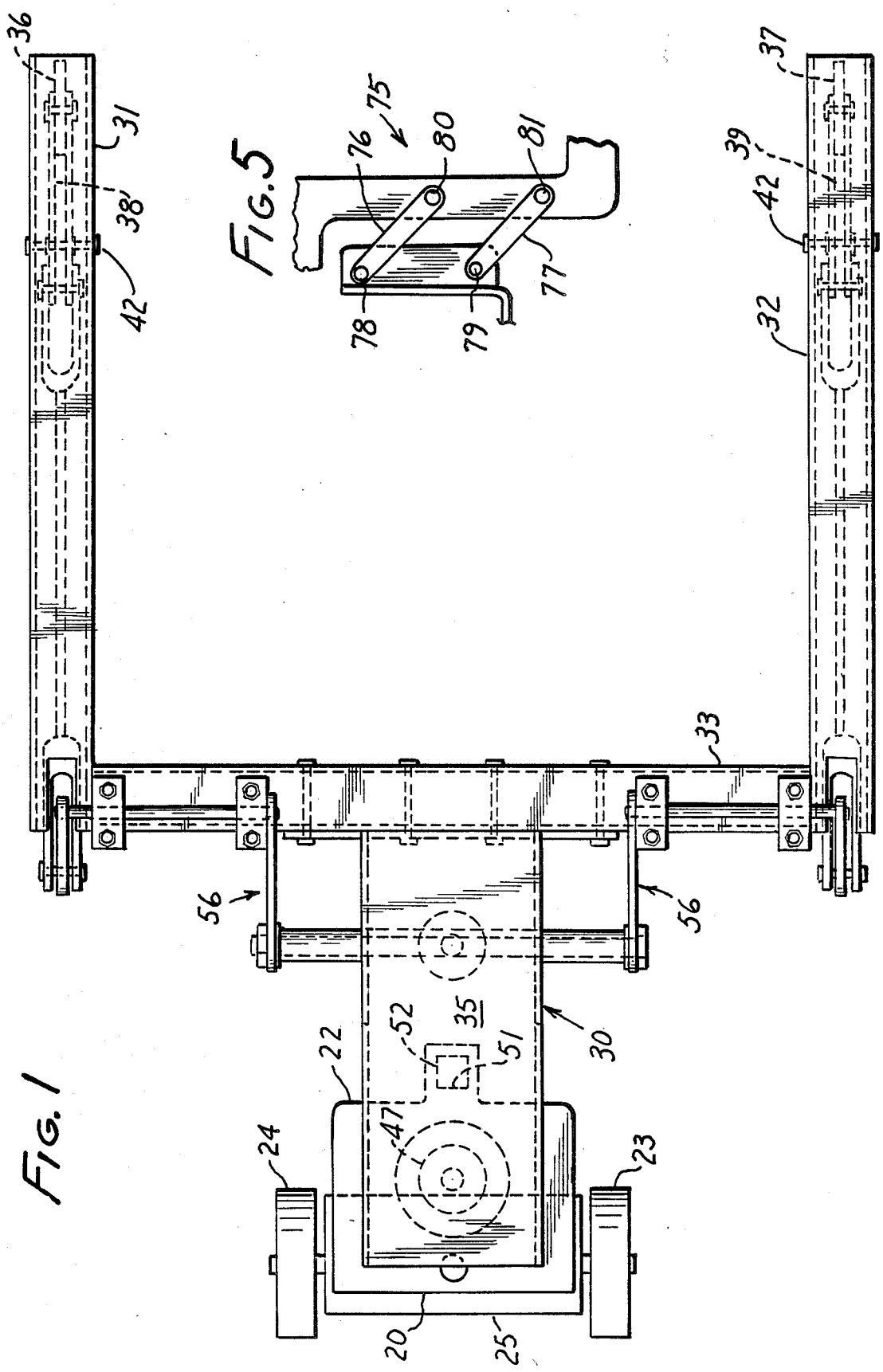

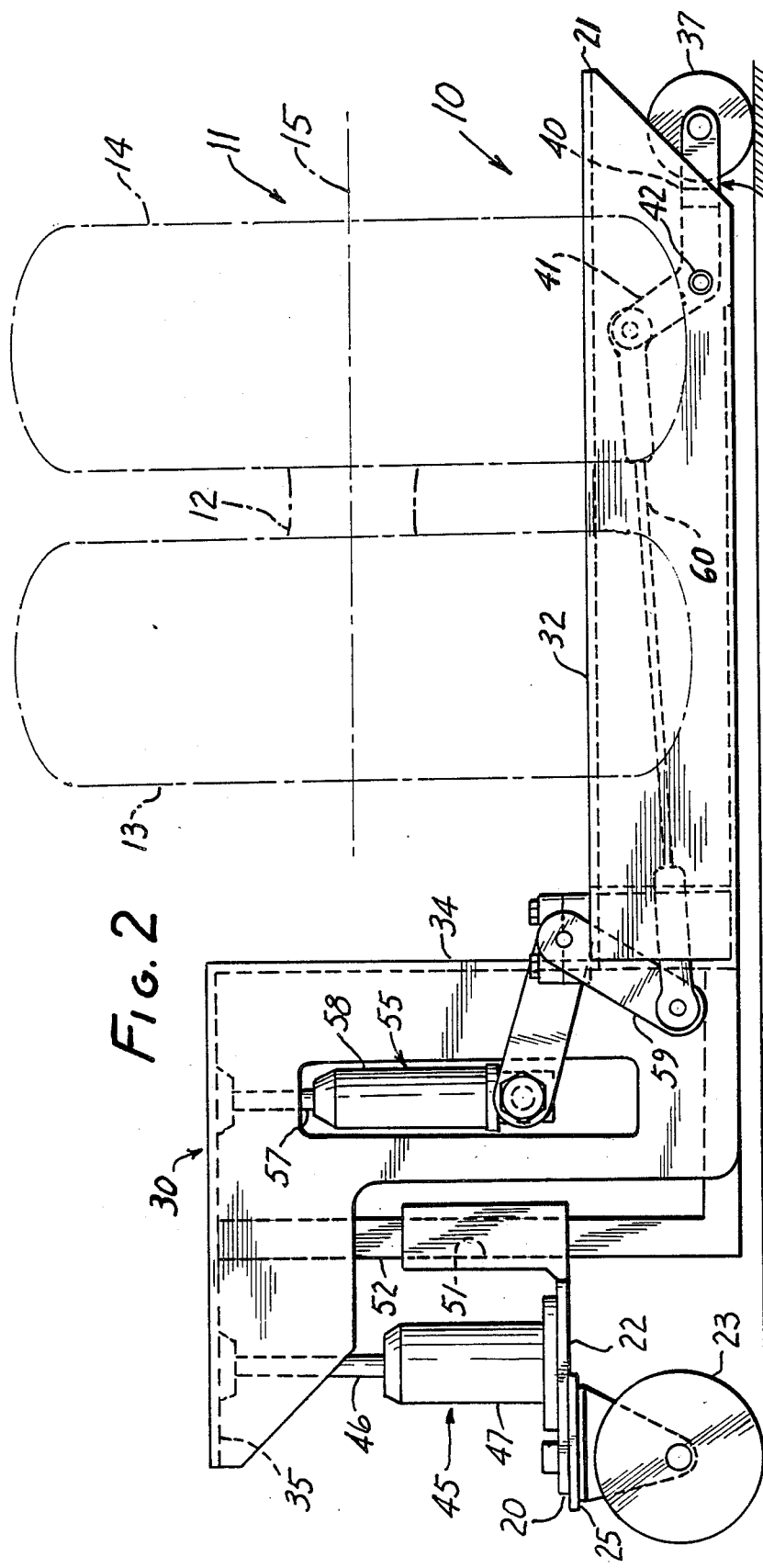
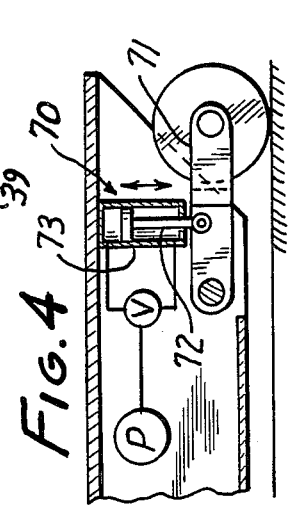
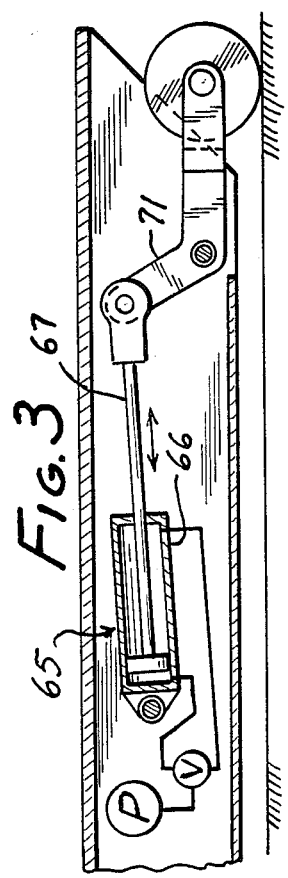

DOLLY FOR SUPPORTING OBJECTS WITH ADJUSTABLE HEIGHT AND INCLINATION

FIELD OF THE INVENTION

This invention relates to dollies adjustably to support an axially to align heavy objects such truck dual wheel assemblies and vehicle transmissions.

BACKGROUND OF THE INVENTION

Especially around automotive vehicles, there are many examples of requirements for removal and replacement where precise angular alignment and precise elevation of an object are essential to avoid damaging seals, drums, linings, and the like. For example, dual truck wheels with tires mounted on them must frequently be removed and replaced to inspect the truck brakes. These are very heavy and cumbersome assemblies, and when handled by one or two men, they can be relied on to be difficult to handle, and frequently will be dropped onto or scrape along some surface where this is undesirable. This can be so troublesome that some mechanics slack on their inspections to the potential danger of the vehicle occupants. Similarly, transmissions must often be installed "straight-in" and a cocking of the axis, or incorrect height, can score seals which must remain undamaged. Other examples of applications for this device are the removal and replacement of power dividers and fly wheels.

Especially in the transmission field, there exist dollies (sometimes called "jacks", which terms will be used interchangeably herein), that adjustably support the transmission. These ar usually provided with various screw-type means to make the necessary adjustments. They are expensive and heavy.

In order for a dolly to be practical in a conventional inspection of repair facility, it must be lightweight, simple to maintain, easy and exact to use, compact, and inexpensive. Excessive weight, for example, merely contributes to the general clumsiness of the combined dolly and its load.

A dolly according to this invention can support heavy weights, for example dual truck wheels with two tires mounted on them, and still weigh only about 50 pounds. It can be made of low cost carbon steel, and provide a delicacy of adjustment one would expect only in a copmplicated expensive dolly. The dolly of this invention is relatively quite inexpensive.

BRIEF DESCRIPTION OF THE INVENTION

A dolly according to this invention provides support with adustment of height of a supported object, and adjustment of the inclination of the axis of this object. It includes a base member adjacent to a firs end of the dolly, and a support member adjacent to a second end of the dolly. These ends are longitudinally spaced-apart from one another. First wheel means support the base member, and second wheel means support the support member.

First elevator means, perhaps a piston/cylinder assembly, is interposed between the base member and the support member to raise na to lower the support member relative to the base member at a location longitudinally removed from the second wheel means. Second elevator means is disposed between the support means annd pivotal lever means that mount the second wheel means to the support member. Raising and lowering of the support member is attained by actuating the second elevator means so as to adjust the vertical distance between the support member and the second wheel means.

Elevation is adjusted by actuating both elevator means. Inclination is adjusted by actuating one elevator means differentially relative to the other elevator means, or by differentially actuating both.

According to a preferred but optional feature of the invention, the support member has a pair of legs to cradle the supported object.

The above and other feature of this invention will be fully understood from the following detailed description, and the accompanying drawings, in which:

BRIEF DESCRIPTION OF THE DRAWINGS

FIG. 1 is a top plan view of the presently preferred embodiment of the invention;

FIG. 2 is a side view of FIG. 1;

FIG. 3 and 4 are fragmentary cut-away views showing alternate second elevator means; and FIG. 5 is a fragmentary side view showing an optional embodiment of means for interlonking the base member to the support member.

DETAILED DESCRIPTION OF THE INVENTION

A dolly 10 according to the invention is adapted to support an object 11 such as, for example, a dual truck wheel 12 with a pair of tires 13,14 mounted thereon. This wheel assembly has an axis 15 whose height and inclination relative to the horizontal must be adjusted iun order that the assembly can smoothly be placed onto the axle without harming surrounding equipment or subjecting the workers to unnecessary heavy labor. It is intended that the dolly be readily steerable and convenently pushed and pulled by the user.

The dolly has a first end 20 where the user will generally stand, and a second end 21 adjacent to which the object is to be supported. A base member 22 is located adjacent to the first end and is supported by a pair of first wheel means 23,24. These wheels may be axially mounted to a trunnion plate 25 atop which the base member is rotatably fixed. Optionally, the wheels could be castertype wheels fixed directly to the base member itself, although this is not preferred. A steering handle (not shown) can be attached to trunnion plate for steering purposes.

A support member 30 extends from the second end and includes in its preferred embodiment, a pair of legs 31,32 which can cradle a supported object between them. The legs are joined at a central bight 33, which has an ascending portion 34 that rises to an overhanging flange 35 that extends toward the first end. The second end of the support member is supported by second wheel means 36,37 which in turn are mounted to respective legs 31,32 by lever means 38,39. In the preferred embodiment, the lever means are a first-class lever with a first arm 40 mounting the wheels an a second arm 41 connected to elevator means yet to be described. A hinge pin 42 mounts the lever means to the respective leg.

First elevator means 45 is interposed between the base member and the support member and extends generally vertically. In the preferred embodiment it is a piston/cylinder assembly with a piston rod 46 and a cylinder 47 (the piston inside the cylinder not being shown). This is a conventional hydraulic jack instruction whose details need not be shown, because they are completely conventional. Extension of the rod is ordinarily accomplished by pumping with a handle, and retraction by opening a valve usually by twisting the handle. Preferably the piston/cylinder assembly has substantial resistance to lateral bending, and therefore can serve as an interlinking means to interlink the base member and support member if desired. However, it is undesirable to place excessive side loads on such assemblies, and therefore interlinking means 50 are preferably also provided. In this case the interlinking means is a guide 50 in the form of a sleeve fixed to the base member and a rail 52 fixed to the support member. The interlinking means will therefore take the side loads caused by pulling the base member relative to the support member and will cause the suppot member to follow the base member, and the sleeve/rail arrangement allows for height adjustment.

Second elevator means 55 is interposed between the support member and the second wheel means, preferably by a linkage 56. Again, the second elevator means is a conventional hydraulic jack construction conveniently actuated by a jack handle and release valve. It will be understood that in every case, a supplementary hydraulic supply could instead by provided, together with conventional hydraulic valving to cause extension and retraction fo these assemblies. Again, the preferred form includes a piston rod 57, and a cylinder 58, a form of jack. The rod is attached to the support member, and the cylinder is connected to an arm of a bell crank mechanism 59, which is pivoted to the support member. A pushrod 60 completes the linkage 56 and connects to the lever means.

FIG. 3 shows an optional construction of second elevator means 65 in which the cylinder 66 is pivotally mounted to a leg of the support, and the piston rod 67 pivotally attached to an arm of the lever means. In this convenient embodiment, a second elevator means is contained within each suppor member and is not exposed as it is in FIG. 2.

FIG. 4 shows another embodiment of second elevator means wherein the lever means 71 is a third-class lever and the piston rod 72 is directly attached to the lever between its point of attachment and the wheel. Again, the cylinder 73 is provided with a suitable pressure source and valving means. Such means is provided in each leg.

FIG. 5 shows an alternate embodiment of interlinking means 75, in this case a parallelogram movement with two parallelogram bars 76, 77 mounted at two points 78,79 on the base member and at two points 80,81 on the support member. This construction will take the loads exerted when the jack is pulled along the ground.

It will now be seen that this dolly is an elegantly simple construction. If the object is to be lifted in elevation with its axis at the same elevation, then both elevator means will be simultaneously actuated. Should the inclination need to be changed, then they will be differentially actuated either by actuating only one of them or by actuating both of them, but in different directions or at different rates.

The device is easily maintained and light of weight. It is able to take very heavy objects, adjust their height and inclination quickly, and then to be stored conveniently awaiting reuse.

This invention is not to be limited by the embodiments shown in the drawings and described in the description, which are given by way of example and not of limitation, but only in accordance with the scope of the appended claims.

I claim:

1. A dolly for supporting and aligning objects, which objects have a central axis whose elevation and inclination are to be adjusted while the object is supported by the dolly, said dolly comprising:

a base member adjacent to a first end of said dolly;

a support member adjacent to a second end of said dolly; said ends being longitudinally spaced apart form one another;

first wheel means supporting said base member;

second wheel means supporting said support member, said first and second wheel means being longitudinally spaced apart from one another;

pivotable lever means mounting said second wheel means to said support membe,r whereby pivoting movement of said lever means selectively raises or lowers said second end of said dolly relative to said second wheel means;

first elevator means interposed between said base membe and said support member so disposed and arranged as selectively to raise or to lowe said support member relative to said base member at a location longitudinally removed from said second wheel means;

second elevator means so disposed and arranged between said support member and said lever means, as to cause said pivotable movement, said elevator means being separte from one another, and separately operable, whereby the elevation of said support member, without changing its inclination, can be adjusted by simultaneous actuation of both of said elevator means, and the inclination of said support member can be adjusted by differential actuation of either or both of said elevator means.

2. A dolly according to claim 1 in which said support means comprises a pair of laterally spaced apart legs adapted to support said object between them, there being said second wheel means on both of said legs, and said second elevator means being actuable relative to both of said legs.

3. A dolly according to claim 1 in which linking means links said base member to said support member to resist their longitudinal separation.

4. A dolly according to claim 3 in which said linking means comprises a pivotable parallelogram assembly attached at two points to said base member, and at two points to said support member.

5. A dolly according to claim 3 in which said linking means comprises a guide fixed to one of said members, and a rail fixed to the other of said members, said guide and said rail being engaged for guided relative sliding movement.

6. A dolly according to claim 3 in which said first elevator means is a piston-cylinder assembly having an axis of extension and substantial strength to oppose bending, said piston-cylinder assembly being interposed between said base member and said support member.

7. A dolly according to claim 1 in which said first elevator means is adapted to extend and to retract in a generally upright direction.

8. A dolly according to claim 7 in which said first elevator means is a piston-cylinder assembly with its piston attached to one of said members and its cylinder attached to the other of said members.

9. A dolly according to claim 1 in which said second elevator means comprises extensible means interposed between said support member and said lever means.

10. A dolly according to claim 9 in which said lever means is a third class lever with said extensible means linked to said lever between said second wheel means and a point of attachment of said lever means to said support means.

11. A dolly according to claim 9 in which said lever means is a first class lever pivotally mounted to said support means with a first arm linked to said extensible means, and having a second arm mounting said second wheel means.

12. A dolly according to claim 11 in which bellcrank means interlinks said lever means and said extensible means.

13. A dolly according to claim 9 in which linking means links said base member to said support member to resist their longitudinal separation, said linking means comprising a guide fixed to one of said members, and a rail fixed to the other of said members, said guide and said rail being engaged for guided relative sliding movement.

14. A dolly according to claim 13 in which said guide is a sleeve encircling said rail.

15. A dolly according to claim 13 in which said first elevator means is adapted to extend and to retract in a generally upright direction.

* * * * *